UNITED STATES PATENT OFFICE.

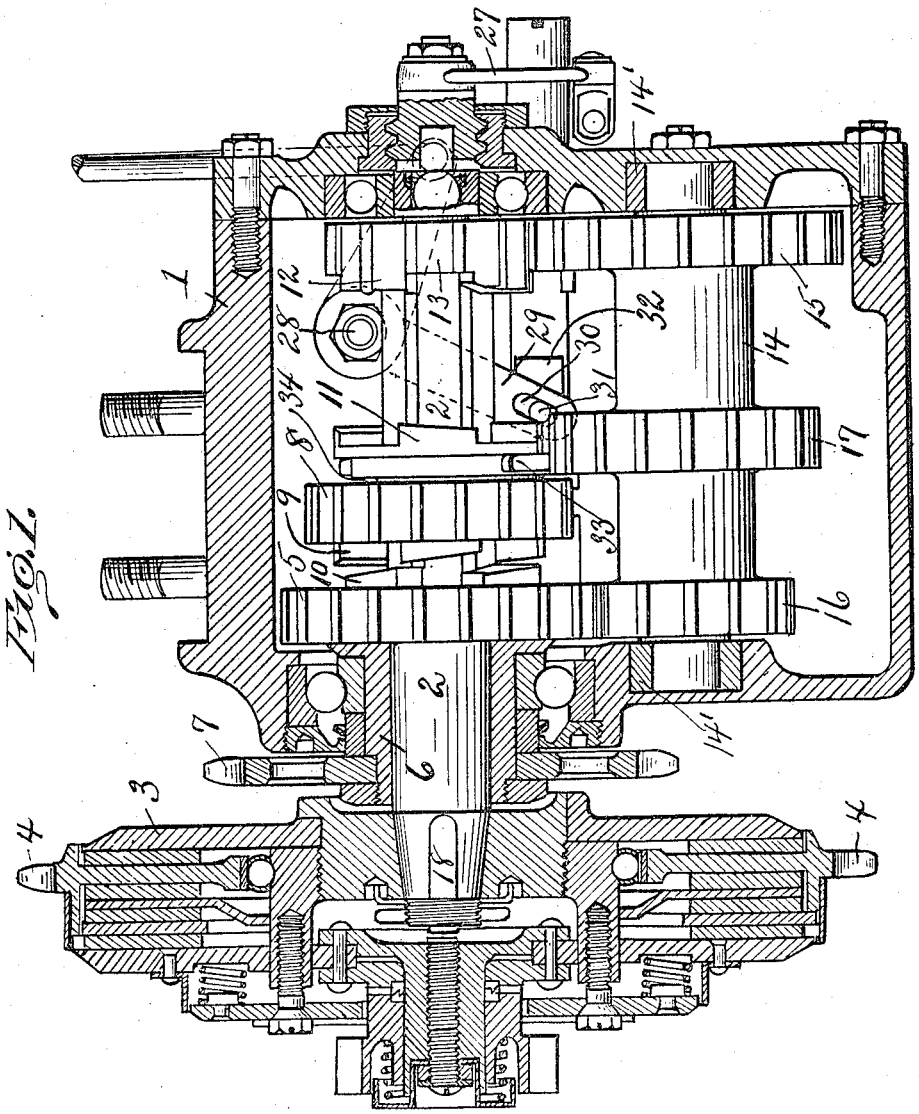

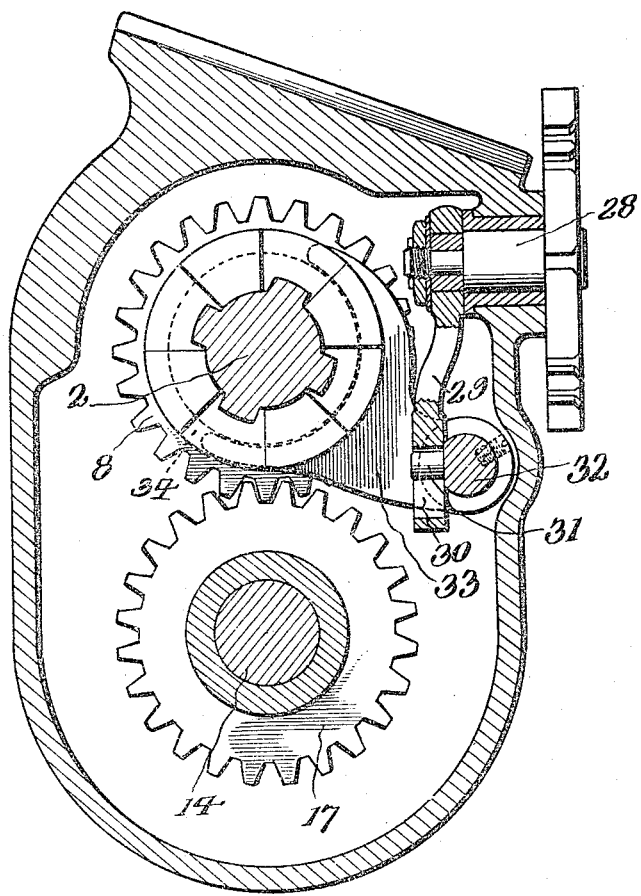

CARL JOHAN GUSTAFSON, OF SPRINGFIELD, MASSACHUSETTS, ASSIGNOR TO HENDEE MANUFACTURING COMPANY, OF SPRINGFIELD, MASSACHUSETTS, A CORPORATION OF MASSACHUSETTS.

THREE-SPEED SLIDING TRANSMISSION.

1,288,875.  Specification of Letters Patent.  Patented Dec. 24, 1918.

Application filed January 9, 1915. Serial No. 1,361.

*To all whom it may concern:*

Be it known that I, CARL JOHAN GUSTAFSON, a subject of the King of Sweden, residing at Springfield, in the county of Hampden, State of Massachusetts, have invented certain new and useful Improvements in Three-Speed Sliding Transmissions, of which the following is a description, reference being had to the accompanying drawing and to the figures of reference marked thereon.

My invention relates to improvements in three speed sliding transmission mechanism.

An object of my invention is to provide a three speed sliding transmission mechanism, in which it is necessary to shift to intermediate in changing from high to low or vice versa.

Another object of my invention is to provide a three speed sliding transmission mechanism, in which a counter shaft is employed in the transmission of power at intermediate and low speeds.

In the accompanying drawings:

Figure 1 is a vertical longitudinal sectional view of my improved sliding gear transmission mechanism, showing a clutch for transmitting the power to the main drive shaft; and Fig. 2 is a transverse sectional view.

Referring now the drawings, 1 represents the gear casing of my improved three speed sliding transmission mechanism and has rotatably mounted therein the shaft 2 which extends out beyond the end of the casing. The end of the shaft 2 on the outside of the casing, has rigidly mounted thereon the clutch 3, which is adapted to rotate with the shaft and by means of which power is transmitted from the clutch to the gears in the casing.

In my improved sliding gear transmission mechanism, I have shown it as it would be applied to a motorcycle, using the usual chain drive, but it will be understood that it could be used in motor vehicles or in any other desired place where such a sliding transmission can be used.

The sprocket wheel 4 is driven by a chain extending from the engine and is driven thereby and through the friction clutch 3 the shaft 2 is rotated. While I have shown a specific form of friction clutch, the same forms a separate invention, and therefore have not deemed it necessary to describe the same.

Loosely mounted on the shaft 2 on the inside of the casing adjacent the friction clutch is a gear 5, which has its hub extending outwardly beyond the end of the casing, and rigidly secured to the said hub is a sprocket wheel 7, over which a chain passes and by means of which the motorcycle is driven, as is well understood by those skilled in the art.

The sprocket wheel 7 having the hub 6 rigidly secured thereto, it will be seen that the gear 5 is at all times the driving gear for the sprocket 7.

The shaft 2, as shown in the drawings, extends entirely through the casing and has its inner end journaled in bearings 2' in the end of the casing. The shaft 2 beyond the gear 5 is provided with a gear 8, which is slidably mounted on the shaft, but keyed against rotation and whereby it at all times rotates with the shaft and is free to move longitudinally thereon. One face of the said gear is provided with beveled lugs 9 which are adapted to interlock with the beveled lugs 10 carried by the gear 5, and by means of which the rotary motion of the shaft 2 is directly imparted to the gear 5 and is the high speed of the transmission.

The opposite face of the gear 8 is provided with beveled lugs 11, which are adapted to engage with the beveled lugs 12 carried by the inner face of the gear 13 and by means of which the gears 8 and 13 are locked together. The gear 13 is rotatably mounted upon the shaft 2, but held against longitudinal movement thereon so that the beveled lugs 11 and 12 are interlocked, coupling the two gears together.

Mounted within the lower end of the casing 1, directly below the shaft 2, is a counter-shaft 14, which is journaled in proper bearings 14' in the inner face of the casing. The counter-shaft 14 has a gear 15 rigidly keyed thereon at one end and which at all times meshes with the gear 13 loosely mounted upon the shaft 2. The opposite end of the counter-shaft 14 has a gear 16 rigidly secured thereto and which at all times meshes with the gear 5. Carried by the counter-shaft 14, midway between the gears 15 and 16 and rigidly locked thereon, is a gear 17, which is adapted to mesh with the gear 8 when the same is shifted into the proper position and represents the intermediate gear.

The gear 16, as shown in the drawing, is the smallest of the three gears rigidly carried by the counter-shaft 14. The gear 17 carried by the counter-shaft 14 is slightly larger than the gear 16 and the gear 15 is slightly larger than the gear 17, the object of which will be hereinafter more fully described.

Passing longitudinally through the shaft 2 is a pin 18, which is adapted to operate the friction clutch 3 and which is operated by means of the lever 27, shown at the right of the drawings, but which forms no part of this invention and, therefore, will not be further described.

Extending within the casing 1 from one side is a shaft 28, which has an operating lever on the outside of the casing for oscillating the same. The shaft 28 on the inside of the casing is provided with a downwardly extending arm 29, having an elongated slot 30 into which passes a pin 31 carried by an extension 32 of a forked member 33. This forked member 33 passes in the groove 34 carried by the gear 8 between the said gear and the beveled lugs 11, and allows of the free rotation of the gear. The shaft 2 is continuously rotated by the clutch, as is well understood, and when the gear 8 is in the position shown in the drawings, and the gear 5 is loose on the shaft, it will be seen that the gear and its hub 6 are not rotating. By moving the lever 29 the beveled lugs 9 and 10 are caused to interlock and the gear 8 being held on the shaft 2 against rotation, it will be seen that the gear 5 is driven direct from the shaft 2 and is the high speed. When the gear 8 is shifted by the lever 29 to mesh with the gear 17, the gear 17 is driven and in turn drives the gear 16 and the gear 16 meshes with the gear 5 and drives the same, and the hub is likewise rotated and represents the intermediate speed.

When the gear 8 is shifted, so that the beveled lugs 11 mesh or interlock with the beveled lugs 12 of the gear 13, the gear 13 is driven directly with the gear 8. This gear 13 meshing with the gear 15 drives the said gear and the same being mounted upon the counter-shaft 14, against rotation, drives said shaft and the gear 16 being rigid thereon drives the gear 5, and represents the low speed.

The low and intermediate speed is obtained by the relative sizes of the gears 8, 13, 15 and 17. The gear 5 does not perform any function in the high speed except that of a lock for driving it directly from the shaft 2.

While I have shown this specific form of locking the sliding gear to the gears on either side thereof, it will be understood that the same could be varied without departing from the spirit of my invention.

Having thus described my invention, what I claim as new and desire to secure by Letters Patent, is:

1. A sliding transmission mechanism comprising a driven shaft, two gears rotatably mounted upon said shaft and spaced apart, a sliding gear keyed to the shaft against rotation and adapted to be locked to either of the rotatably mounted gears, a counter-shaft below the driven shaft, gears rigidly carried by the counter-shaft and meshing with the gears carried by the driven shaft, a stub-shaft extending at right angles to the driven shaft, a rigid arm carried by said stub-shaft and having a slot therein, and an inwardly extending pin carried by the sliding gear and passing through said slot in the arm, and means for operating said stub-shaft.

2. A sliding transmission mechanism comprising a casing, a driven shaft, two gears rotatably mounted upon said shaft and spaced apart, a sliding gear keyed to the shaft against rotation and adapted to be locked to either of the rotatably mounted gears, a counter-shaft below the driven shaft, gears rigidly carried by the counter-shaft and meshing with the gears carried by the driven shaft, a stub-shaft mounted in the casing at right angles to the driven shaft, an operating arm carried by one end of the shaft, an arm carried by the opposite end of the stub shaft within the casing and having a slot at its outer end, a forked member carried by the loose gear and having a lateral extension parallel with the driven shaft, and a lug carried by the extension and entering the slot carried by the arm of the stub-shaft.

3. A sliding transmission comprising a series of shafts and gears, a sliding gear, a forked member carried by the sliding gear and having a lateral extension parallel with the shaft, a lug carried by the extension and extending toward the shaft, a stub shaft mounted in the casing at right angles to the driven shaft, an arm carried by the inner end of the stub shaft within the casing and having a bifurcated free end into which extends the lug, and operating means carried by the outer end of the stub shaft.

In testimony whereof, I affix my signature in the presence of two witnesses.

CARL JOHAN GUSTAFSON.

Witnesses:
CLARENCE A. EARL,
JOHN D. STEPHENS.